United States Patent [19]

Seki et al.

[11] Patent Number: 4,891,174

[45] Date of Patent: Jan. 2, 1990

[54] PROCESS FOR PREPARATION OF MICRO-CELLULAR POROUS CERAMIC BODY

[75] Inventors: Yachiho Seki, Kawanishi; Saburo Kose; Teruo Kodama, both of Ikeda, all of Japan

[73] Assignee: Agency of Industrial Science and Technology, Tokyo, Japan

[21] Appl. No.: 263,924

[22] Filed: Oct. 28, 1988

[30] Foreign Application Priority Data

Dec. 25, 1987 [JP] Japan ................. 62-331193

[51] Int. Cl.$^4$ ............................................. C04B 38/06
[52] U.S. Cl. ..................... 264/44; 264/125; 501/81; 501/82
[58] Field of Search ...................... 501/81, 82; 264/44, 264/125

[56] References Cited

U.S. PATENT DOCUMENTS

| | | | |
|---|---|---|---|
| 3,911,070 | 10/1975 | Lundsager | 501/82 X |
| 3,932,310 | 1/1976 | Turner | 501/82 X |
| 3,963,504 | 6/1976 | Lundsager | 501/82 |
| 4,560,526 | 12/1985 | Okumura | 501/88 X |

FOREIGN PATENT DOCUMENTS

| | | | |
|---|---|---|---|
| 7047757 | 3/1982 | Japan | 501/82 |
| 59-43433 | 10/1984 | Japan . | |

*Primary Examiner*—Mark L. Bell
*Assistant Examiner*—Karl Group
*Attorney, Agent, or Firm*—Armstrong, Nikaido, Marmelstein, Kubovcik & Murray

[57] ABSTRACT

A process for the preparation of a micro-cellular porous ceramic body is disclosed, in which an α-olefin oligomer is added as a molding assistant to an ultrafine ceramic powder in an amount of 65 to 330% by weight based on the ultrafine ceramic powder, the mixture is kneaded, the kneaded mixture is compression-molded to give a molded body, and the molded body is fired.

11 Claims, No Drawings

PROCESS FOR PREPARATION OF MICRO-CELLULAR POROUS CERAMIC BODY

BACKGROUND OF THE INVENTION

The present invention relates to a process for the preparation of a porous ceramic body having very fine cells having an average pore size of about 0.08 μm (hereinafter referred to as the "micro-cell"). More particularly, the present invention relates to a process in which a porous ceramic body having a high porosity and a fine pore size, which is homogeneous and is neither deformed nor cracked, can be prepared with a high productivity by a simple operation.

Recently, demands for porous ceramic bodies having the micro-cells as the material of filters, electrodes and electrolyte holders of fuel cells, catalyst carriers and the like have been increasing rapidly.

These porous ceramic bodies are generally prepared by molding a mixture of a ceramic powder with a combustible substance and firing the molded body.

According to this process, a porous body having an average pore size of about 2 to about 3 μm and a porosity of about 80% can be obtained. However the upper limit of the porosity of a porous body having the micro-cells is about 65%, and no micro-cellular porous ceramic body having a porosity exceeding this level can be prepared by this process.

This is because although a fine organic powder should be added for formation of the micro-cells, the molded body inevitably collapses in the firing step, if the amount of the fine organic powder exceeds a certain limit.

According to this process using an organic powder, since it is difficult to reduce the particle size of the powder to several μm or below, micro-cells having a diameter smaller than several μm are hardly formed. Moreover, this process is defective in that since the organic powder is elastic, the molded body is liable to be expanded and cracked, when the molding pressure is released after the molding operation.

As another process for preparing a porous ceramic body, there is known a process in which a polyurethane foam is used as the base material, from which the walls of the cells are removed and the foam is then coated with a ceramic material to give a porous body having open cells. The porosity of the porous body prepared according to this process is 85 to 90%, but the pore size is as large as about 1 to about 4 mm so that no micro-cellular porous body can be prepared.

Furthermore, as the process for the preparation of a porous body which is dense and has the micro-cells, there is known a process in which up to 10% by weight of water or an aqueous solution of a binder is added to a starting ceramic powder, the mixture is press-molded and the molded body is fired.

According to this process, a sintered body having the micro-cells can be obtained and when the amount of water is increased to 18 to 22% by weight, extrusion molding becomes possible but the porosity of the green molded body is 40 to 50% and no porous body having a porosity higher than 50% can be obtained. Moreover, when the amount of water is increased to 22 to 30% by weight, the starting material/water mixture forms a slurry and slip casting is possible, but the porosity of the green molded body is still of the order of about 40 to about 50% so that no molded body having a porosity higher than 50% can be obtained.

As is apparent from the foregoing description, and porous ceramic body having a high porosity, a fine pore size and an excellent quality cannot be obtained according to any of the conventional processes.

SUMMARY OF THE INVENTION

It is therefore a primary object of the present invention to provide a process for the preparation of a porous ceramic body having a high porosity and micro-cells.

Another object of the present invention is to provide a process in which a porous ceramic body which is homogeneous and has an excellent quality with neither deformation nor cracking can be prepared with a high productivity by a simple operation.

In accordance with the present invention, these objects can be attained by preparing a microcellular porous ceramic body by adding 65 to 330% by weight of an α-olefin oligomer as a molding assistant to an ultrafine ceramic powder, kneading the mixture, compression-molding the kneaded mixture to form a molded body and firing the molded body.

DETAILED DESCRIPTION OF THE PREFERRED EMBODIMENTS

In the present invention, the kind of the ceramic material to be used as the starting material is not particularly critical, and any of materials customarily used for the production of molded ceramic bodies can be arbitrarily used. More specifically, at least one ceramic material selected from among oxide ceramics such as alumina, silica, zirconia, magnesia and titania and non-oxide ceramics such as silicon carbide, silicon nitride and boron nitride can be used in the present invention.

In the present invention, an ultrafine - ceramic powder having an average particle size not larger than 2.5 μm, preferably an average particle size of 0.005 to 2.5 μm, is used.

If the average particle size exceeds 2.5 μm, it is impossible to increase the amount of addition of a molding assistant described hereinafter, and any porous body having a high porosity can hardly be obtained.

The lower limit of the average particle size is not particularly critical. However, a ceramic powder having an average particle size smaller than 0.005 μm is not practically available and a powder having such a fine particle size is difficult to handle so that any particular merit cannot be obtained. Use of a ceramic powder having an average particle size of 0.005 to 0.10 μm is most desirable from the economic viewpoint and in view of the porosity, pore size and quality.

In the ceramic powder used in the present invention, the bulk specific gravity is about 0.005 to about 0.15, and the bulk specific surface area is about 50 to about 500 $m^2/g$. The purity of the ultrafine ceramic powder is not particularly critical, and the purity of a commercially available product is sufficient.

In the process of the present invention, a liquid α-olefin oligomer is added as the molding assistant to the ultrafine ceramic powder. By the α-olefin is meant a lower α-olefin having 6 to 50 carbon atoms, and a single α-olefin oligomer or a mixture of two or more of them can be used. The α-olefin oligomer is generally liquid and has a molecular weight of 70 to 700. Although the viscosity of the oligomer is not particularly critical, an α-olefin oligomer having a viscosity of 2 to 40 cSt as measured at 37.8° C. is preferably used.

The amount of the α-olefin oligomer added is selected within the range of 65 to 330% by weight based on the starting ultrafine ceramic powder. This amount is dependent on the particle size and specific surface area of the ultrafine ceramic powder and is about 0.014 to about 0.02 g/m$^2$ as calculated per unit specific surface area of the ultrafine powder. If this amount is smaller than 0.014 g/m$^2$, lamination occurs in the molded body, while if it exceeds 0.02 g/m$^2$, the α-olefin oligomer per se or a slurry mixture of the ultrafine ceramic powder with the α-olefin oligomer tends to escape from the mold.

Since the starting ultrafine ceramic powder has a good wettability with the α-olefin oligomer, a preliminary treatment that should be performed when an ordinary molding assistant such as liquid paraffin is used is not particularly necessary, and the αolefin oligomer can be directly added to the starting ceramic powder.

In the process of the present invention, the α-olefin oligomer is added to the above-mentioned starting ceramic powder and the mixture is kneaded. The obtained kneaded mixture in a wet state is compression-molded to form a green molded body having a desired shape, which is then fired.

A uniaxial press molding process and a hydrostatic press molding process can be adopted as the compression molding method. It will suffice if the molding pressure is such that the desired shape is retained and a strength guaranteeing good handling is given. Thus a pressure of 30 to 500 kg/cm$^2$ is ordinarily adopted as the molding pressure. In general, elevation of the molding pressure results in an increase in the density of the green molded body, thus reducing the porosity of a porous ceramic body prepared by firing. For example, if the molding pressure is increased to 300 kg/cm$^2$ from 50 kg/cm$^2$, the porosity of a porous alumina body prepared by firing at 1350° C. is reduced by about 1%.

When the α-olefin oligomer is added in an amount exceeding the above-mentioned range of 65 to 330% and the mixture is molded, the α-olefin oligomer bleeds and acts as a lubricant providing a good release between the molded body and the mold.

The strength of the green molded body obtained by molding is relatively high, though a large amount of the α-olefin oligomer is contained. When however, the particle size of the starting ultrafine powder exceeds 1 μm, the green strength of the obtained molded body is insufficient and handling becomes difficult.

When the green molded body is fired, the α-olefin oligomer contained in the molded body is gasified and lost, and a micro-cellular porous ceramic body is obtained. The firing temperature is appropriately selected according to the kind of the ceramic material and generally ranges from 500 to 1400° C.

The porosity of the obtained porous ceramic body is dependent on the particle size of the starting ceramic powder, the molding pressure or the like, but the average porosity is generally 60 to 90%. The pore diameter is ordinarily smaller than 12 μm, and the pores have an average pore size of 0.08 to 0.46 μm and are very fine. About 90% of the pores are open-cellular.

As is apparent from the foregoing description, according to the process of the present invention for the preparation of a porous ceramic body by using an α-olefin oligomer as the molding assistant, a porous ceramic sinter having such excellent characteristics as a higher porosity and a finer pore size than in the products of the conventional processes can be prepared with a high productivity. Moreover, according to the process of the present invention, since a preliminary treatment of the starting material is not always necessary, the preparation process can be simplified and a product having a homogeneous quality can be obtained.

The porous ceramic sintered body obtained according to the present invention is suitably used for a filter, an electrode and an electrolyte holder of a fuel cell, a catalyst carrier or the like.

The present invention will now be described in detail with reference to the following Examples.

EXAMPLE 1

To 5 g of a fine powder of silica having an average particle size of 0.012 μm was directly added 16.4 g of an α-olefin oligomer (viscosity of 17 cSt/ 37.8° C.), and the mixture was kneaded, filled in a mold and molded under a pressure of 200 kg/cm$^2$ to give a molded body. The molded body was placed in an electric furnace and fired. In the firing step, the temperature was elevated to 300° C. from room temperature at a rate of 10° C./hr and was then elevated beyond 300° C. at a rate of 70° C./hr, and the molded body was maintained at 850° C. for 12 hours. A micro-cellular, high-porosity porous body having a porosity of 90% and an average pore size of 0.08 μm was obtained.

EXAMPLE 2

To 10 g of an ultrafine powder of alumina having an average particle size of 0.020 μm was directly added 19.6 g of an α-olefin oligomer (viscosity of 17 cSt/37.8° C.), and firing was carried out at 1000° C. for 5 hours in the same manner as that described in Example 1. A micro-cellular porous body having a porosity of 88% and an average pore size of 0.08 μm was obtained.

EXAMPLES 3 THROUGH 12

Micro-cellular porous ceramic bodies were prepared under the conditions shown in the following Table in the same manner as that described in Example 2. Data of the linear shrinkage and average porosity obtained with respect to these fired bodies as well as that of Example 2 are shown in the following Table.

In the Table by the pretreating agent is meant a liquid added for preventing formation of cracks in the firing step. More specifically, 15 to 20 me of the pretreating agent was added to 10 g of the ultrafine powder of alumina to prepare a concentrated slurry. The slurry was dried (for removal of the pretreating agent) and pulverized, and the resulting solid was mixed with the α-olefin oligomer. By this treatment, the bulk density of the ultrafine powder of alumina was increased.

TABLE

| Example No. | Pretreating agent | α-Olefin oligomer kind | α-Olefin oligomer amount[2] (g) | Conditions pressure (kg/cm²) | Conditions temperature (°C.) | shrinkage (%) | average porosity (%) | average poresize (μm) |
| --- | --- | --- | --- | --- | --- | --- | --- | --- |
| 2 | — | Lipolube 20[1] | 19.6 | 200 | 1000 | 0.5 | 88.0 | 0.080 |
| 3 | — | Lipolube 20[1] | 19.6 | 200 | 1100 | 2.9 | 78.1 | 0.076 |
| 4 | — | Lipolube 20[1] | 19.6 | 200 | 1200 | 9.0 | 81.0 | 0.12 |
| 5 | — | Lipolube 20[1] | 19.6 | 200 | 200 | 29.2 | 66.4 | 0.46 |
| 6 | n-hexane | Lipolube 20[1] | 9.8 | 100 | 1000 | 1.6 | 80.0 | 0.080 |
| 7 | benzene | Lipolube 20[1] | 10.6 | 100 | 1000 | 1.7 | 78.8 | 0.080 |
| 8 | ethanol | Lipolube 20[1] | 6.5 | 100 | 1000 | 1.4 | 71.1 | 0.16 |
| 9 | water | Lipolube 20[1] | 6.5 | 100 | 1000 | 2.0 | 69.7 | 0.16 |
| 10 | water | Lipolube 20[1] | 6.5 | 50 | 1100 | 7.9 | 63.7 | 0.20 |
| 11 | water | Lipolube 40[1] | 6.6 | 50 | 1100 | 8.1 | 66.1 | 0.22 |
| 12 | water | Lipolube 100[1] | 6.6 | 50 | 1100 | 7.7 | 66.9 | 0.24 |

EXAMPLE 13

To 10 g of an ultrafine powder of magnesia having an average particle size of 0.010 μm was directly added 18.9 g of an α-olefin oligomer (viscosity of 13 cSt/37.8° C.), and firing was carried out at 600° C. for 15 hours in the same manner as that described in Example 1. A micro-cellular porous body having a porosity of 88%, a shrinkage of 4% and an average pore size of 0.04 μm was obtained.

EXAMPLE 14

To 10 g of an ultrafine powder of titania having an average particle size of 0.021 μm was directly added 9.9 g of an α-olefin oligomer (viscosity of 3 cSt/37.8° C.), and firing was carried out at 600° C. for 15 hours in the same manner as that described in Example 1. A micro-cellular porous body having a porosity of 74%, a shrinkage 11% and an average pore size of 0.08 μm was obtained.

What is claimed is:

1. A process for the preparation of a microcellular porous ceramic body produced with ultrafine ceramic powder, which comprises adding 65 to 330 parts by weight of an α-olefin oligomer, based on 100 parts of the ultrafine ceramic powder, as a molding assistant to the ultrafine ceramic powder, kneading the mixture, compression-molding the kneaded mixture to give a molded body, and firing the molded body.

2. A process for the preparation of a micro-cellular porous ceramic body according to claim 1, wherein the average particle size of the ultrafine ceramic powder is not larger than 2.5 μm.

3. A process for the preparation of a micro-cellular porous ceramic body according to claim 1, wherein the average particle size of the ultrafine ceramic powder is 0.005 to 2.5 μm.

4. A process for the preparation of a micro-cellular porous ceramic body according to claim 1, wherein the average particle size of the ultrafine ceramic powder is 0.005 to 0.10 μm.

5. A process for the preparation of a micro-cellular porous ceramic body according to claim 1, wherein the bulk specific gravity of the ultrafine ceramic powder is 0.005 to 0.15.

6. A process for the preparation of a micro-cellular porous ceramic body according to claim 1, wherein the specific surface area of the ultrafine ceramic powder is 50 to 500 m²/g.

7. A process for the preparation of a micro-cellular porous ceramic body according to claim 1, wherein the amount of the α-olefin oligomer added is 0.014 to 0.02 g per m² of the specific surface area of the ultrafine ceramic powder.

8. A process for the preparation of a micro-cellular porous ceramic body according to claim 1, wherein the viscosity of the α-olefin oligomer is 2 to 40 cSt as measured at 37.8° C.

9. A process for the preparation of a micro-cellular porous ceramic body according to claim 1, wherein the molded body is fired at a temperature of 500 to 1400° C.

10. A process for the preparation of a micro-cellular porous ceramic body according to claim 1, wherein the micro-cellular porous ceramic body has an average pore size of about 0.05 μm.

11. A process for the preparation of a micro-cellular porous ceramic body according to claim 1, wherein the micro-cellular porous ceramic body has an average porosity of 60 to 90%.

* * * * *